(12) United States Patent
Stjernholm et al.

(10) Patent No.: US 12,558,637 B2
(45) Date of Patent: Feb. 24, 2026

(54) SAND-MANURE LIQUID SEPARATION PLANT, A USE OF THE PLANT, AND A METHOD OF USING THE PLANT

(71) Applicant: Stjernholm A/S, Randers SV (DK)

(72) Inventors: Kaj Nees Sørensen Stjernholm, Randers SV (DK); Thomas Fleischer Christiansen, Randers SV (DK); Bent Ejnar Juul Simonsen, Randers SV (DK)

(73) Assignee: Stjernholm A/S, Randers SV (DK)

( * ) Notice: Subject to any disclaimer, the term of this patent is extended or adjusted under 35 U.S.C. 154(b) by 0 days.

(21) Appl. No.: 18/944,841

(22) Filed: Nov. 12, 2024

(65) Prior Publication Data

US 2025/0303325 A1     Oct. 2, 2025

(30) Foreign Application Priority Data

Apr. 2, 2024     (EP) ..................................... 24168032

(51) Int. Cl.
| | |
|---|---|
| *B01D 21/26* | (2006.01) |
| *B01D 21/02* | (2006.01) |
| *B01D 21/24* | (2006.01) |

(52) U.S. Cl.
CPC ........... B01D 21/267 (2013.01); B01D 21/10 (2013.01); B01D 21/2405 (2013.01); *B01D 2221/06* (2013.01)

(58) Field of Classification Search
None
See application file for complete search history.

(56) References Cited

U.S. PATENT DOCUMENTS

| | | | | |
|---|---|---|---|---|
| 5,641,397 A | * | 6/1997 | Grienberger | ............ B03B 11/00 |
| | | | | 210/219 |
| 7,318,527 B2 | | 1/2008 | Branner | |

(Continued)

FOREIGN PATENT DOCUMENTS

| | | | | |
|---|---|---|---|---|
| CN | 105384230 A | * | 3/2016 | ............ C02F 1/5209 |
| DK | 1999 00152 U3 | | 8/1999 | |

(Continued)

OTHER PUBLICATIONS

Translation of Yu (Year: 2016).*

(Continued)

*Primary Examiner* — Bradley R Spies
*Assistant Examiner* — Jeannie McDermott
(74) *Attorney, Agent, or Firm* — Trevor K. Copeland; Crowell & Moring LLP

(57)     ABSTRACT

A sand-manure liquid separation plant including a tank for the processing of a mixture of sand and manure liquid. The tank including a top portion having a mixture inlet for filling the mixture to be processed into the tank and a bottom portion having a sand discharge for discharging sand settled in the tank. A maximum level (ML) of filling of the mixture is defined within the tank, wherein the mixture inlet is arranged at a position at a level above the maximum level (ML) of filling. The plant further includes a number of fluid outlet(s) connectable to a source of a fluid and arranged above the maximum level (ML) of filling. The fluid outlets being configured to provide a flow of the fluid directed towards the maximum level (ML), below the position of the mixture inlet.

21 Claims, 10 Drawing Sheets

(56)                    References Cited

U.S. PATENT DOCUMENTS

| | | |
|---|---|---|
| 2010/0200426 A1 | 8/2010 | Camisa |
| 2012/0000029 A1 | 1/2012 | Nicolaou et al. |

FOREIGN PATENT DOCUMENTS

| | | |
|---|---|---|
| EP | 1 123 723 A1 | 8/2001 |
| EP | 2 587 980 B1 | 1/2016 |
| ES | 2 364 879 T3 | 9/2011 |
| GB | 689229 | 3/1953 |
| JP | S50-114043 | 9/1975 |
| KR | 10-0892258 B1 | 4/2009 |
| KR | 10-1008768 B1 | 1/2011 |
| KR | 10-2268655 B1 | 6/2021 |
| WO | WO 00/27539 A1 | 5/2000 |

OTHER PUBLICATIONS

U.S. Appl. No. 18/944,796, filed Nov. 12, 2024, Stjernholm et al.
Extended European Search Report, Oct. 2, 2024, pp. 1-8, issued in European Priority Patent Application No. 24168032.1, European Patent Office, Munich, Germany.
Smart, Stacey, Recycling the highest quality of sand, Dairy Star, Oct. 30, 2023 (Oct. 30, 2023), pp. 1-4, XP093168142, Retrieved from the Internet: URL:https://dairystar.com/stories/recycling-the-highest-quality-of-sand,21386.
Advertisement, Dairy Star, Recycling the highest quality of sand, 4 pages, Oct. 30, 2023 (4 pages).
Additional English Translation of Chinese Patent Publication No. 105384230 B.

\* cited by examiner

SAND-MANURE LIQUID SEPARATION PLANT, A USE OF THE PLANT, AND A METHOD OF USING THE PLANT

This application claims priority under 35 U.S.C. § 119(a) to European Patent Application No. 24168032.1, filed on Apr. 2, 2024, the entire contents of which are incorporated herein by reference.

BACKGROUND OF THE INVENTION

Field of the Invention

The present invention relates to sand-manure liquid separation plants including a tank for the processing of a mixture of sand and manure liquid, the tank including a top portion including a mixture inlet for introducing the mixture to be processed into the tank and a bottom portion including a sand discharge. Preferably the tank also includes a stirrer.

Background Art

When handling manure in stables or barns, where sand is used as a bedding material, the presence of the sand in the manure running through a manure handling plant may cause severe wear on the parts of the plant in contact with the sand. Sand beddings are often preferred to organic material bedding materials due to the lower rate of bacterial growth.

A sand-manure liquid separation plant generally may operate to clean and concentrate the sand so that it can be reused in the stables or barns. Reusing as much of the sand as possible as a bedding material saves money for the farmer, and the benefits are enhanced where the separated sand fulfils certain quality requirements. In certain cases the farmer may wish to use very fine sand for the bedding in order to increase animal welfare since such a bedding is more comfortable to lie on for the animal and reduces the formation of wounds.

It is an object of the present invention to provide for an optimization of a sand-manure liquid separation plant, in particular for operation where the grain size of the sand is small.

BRIEF DESCRIPTION OF THE INVENTION

Disclosed herein is a sand-manure liquid separation plant including a tank for the processing of a mixture including sand and manure liquid, the tank including a top portion including a mixture inlet for filling the mixture to be processed into the tank, and contiguous with a bottom portion including a sand discharge for discharging sand settled in the tank, a maximum level of filling of the mixture defined within the tank, wherein the mixture inlet is arranged at a position at a level above the maximum level of filling. The plant of the invention is particularly advantageous for processing a mixture containing fine sand, such as where 90% by weight or more, such as 95% by weight or more of the sand has a grain size in the order of 100 microns-300 microns.

During operation of sand-manure liquid separation plants, sand of the mixture contained in the tank normally will gradually settle under the action of gravity at the bottom of the tank.

However, where a fine sand containing mixture is supplied, via the mixture inlet, to the fine sand-manure liquid mixture already contained in the tank, a ready settling of the fine sand has been found to be restricted by the surface tension at the surface of the mixture already contained in the tank, this delaying the sand settling process and reducing the efficiency of the plant. To prevent a layer of the fine sand building up on top of the aforementioned surface a breaking-up of the surface has been found to be desirable, by a pneumatic or hydraulic action, optionally supplemented by the addition of a surfactant.

Hence, the plant of the invention moreover includes a number of fluid outlet(s) connectable to a source of a fluid and arranged above the maximum level of filling, the fluid outlet(s) being configured to each provide a flow of the fluid directed towards the aforementioned surface, below the aforementioned position of the mixture inlet. This results in a local breaking-up of the surface, i.e., to eliminate the tendency of the mixture to behave as if its surface were covered with a stretched elastic membrane, this reflecting what follows from the surface tension of the mixture at its surface.

A stirrer preferably serves to stir settled sand such that any impurities, in the form of solid organic matter, remaining on the surface of the grains of sand will raise to the surface of the mixture in the tank, driven by an upward flow of water supplied at the bottom of the tank. This process may be referred to as a "sand-washing" where, in addition to the manure liquid, the solid organic matter continuously leaves the tank at an overflow, to be transported back to a raw manure container from where a raw stream of sand mixed with manure, that may be referred to as "raw manure", was pumped from in the first place. The washed sand is transported away from the bottom portion of the tank by means of one or more screw conveyor and is stored in a sand pile until use. A plant can comprise between eg. 1 to 4 screw conveyers, and each screw conveyer can process up to eg. 1500 kg sand per hour, e.g., in the interval between 800 to 1000 kg. In one or more embodiments, the washed sand contains less than 3% by weight of organic matters as a result of the washing.

In operation of the plant, a raw stream of sand mixed with manure may be pumped from a farmer's raw manure container into a pre-separator in the form of a cyclone where a pre-separation is brought about. A resulting mixture of the sand and manure liquid flows through the cyclone and into the tank of the plant via a tank mixture inlet, while solid organic manure is discharged elsewhere from the cyclone, as a reject.

The aforementioned reject can be transported to a unit, such as a drum screen, for mechanical separation of the material into thin material (having small particles sizes) and thick material (having large particles sizes). The thick material is the sand-free manure, which might be transported to a storing tank and used for biogas and the thin material may be transported into a flush water tank and can then be reused for diluting the raw manure to reach a required dry matter percentage.

It is an advantage of the present invention that most or all of the sand discharged from the container may be reused by the farmer as bedding. Typically, high amounts such at least 95%, or at least 97% by weight or more of the sand being led into the sand-manure separation plant may be reused for bedding material for the animals in the stables or barns. For the farmer, it is an economic benefit to be able to reuse as much sand as possible.

Typically, the discharged sand does not contain more than a maximum of 3% by weight of organic matter. By keeping the amount of organic matter low in the discharged sand, the sand will be more dry since water binds to the organic matter present and hence, the risk of bacterial growth in the sand will also be minimized.

The cyclone may preferably be manufactured in a polyurethane material having a shore hardness value (shore A) in the range of 80 to 100, such as 90. By having the cyclone made in polyurethane material in such a shore hardness value range a high resistance to wear is achieved, considering the sand-manure liquid mixture being processed and separated in the cyclone.

BRIEF DESCRIPTION OF THE FIGURES

FIGS. 4A and 4C show the flow restriction portion in a non-compressed state in a cross-sectional view and seen from an end, respectively, and where FIGS. 4B and 4D show the flow restriction portion in a compressed state, in a cross-sectional view and seen from an end, respectively;

DETAILED DESCRIPTION OF THE INVENTION

Figure 1A:
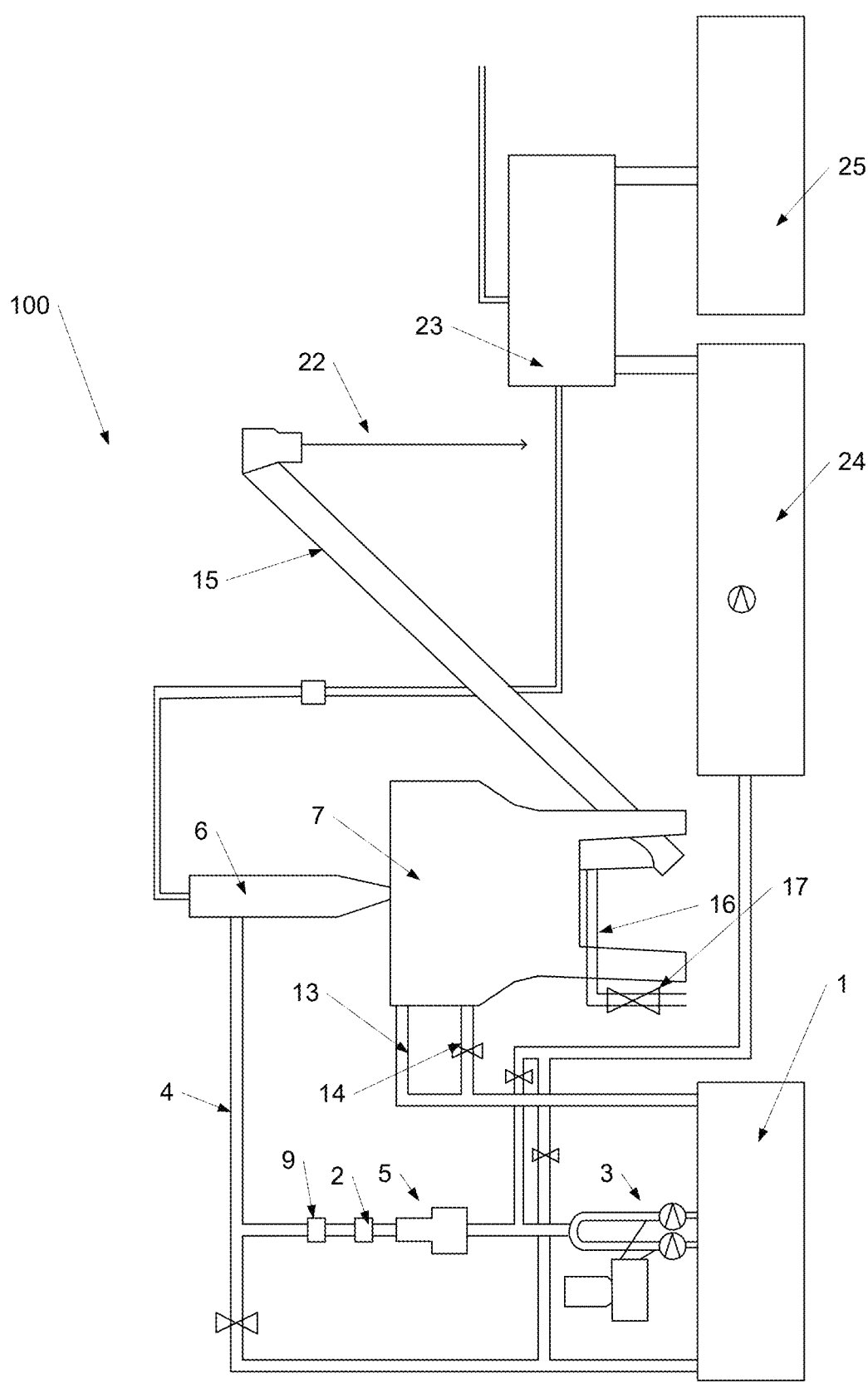
FIG. 1A shows a general overview of an embodiment of a sand-manure liquid separation plant in accordance with the present invention, with a general description of some key elements.
Figure 1B:
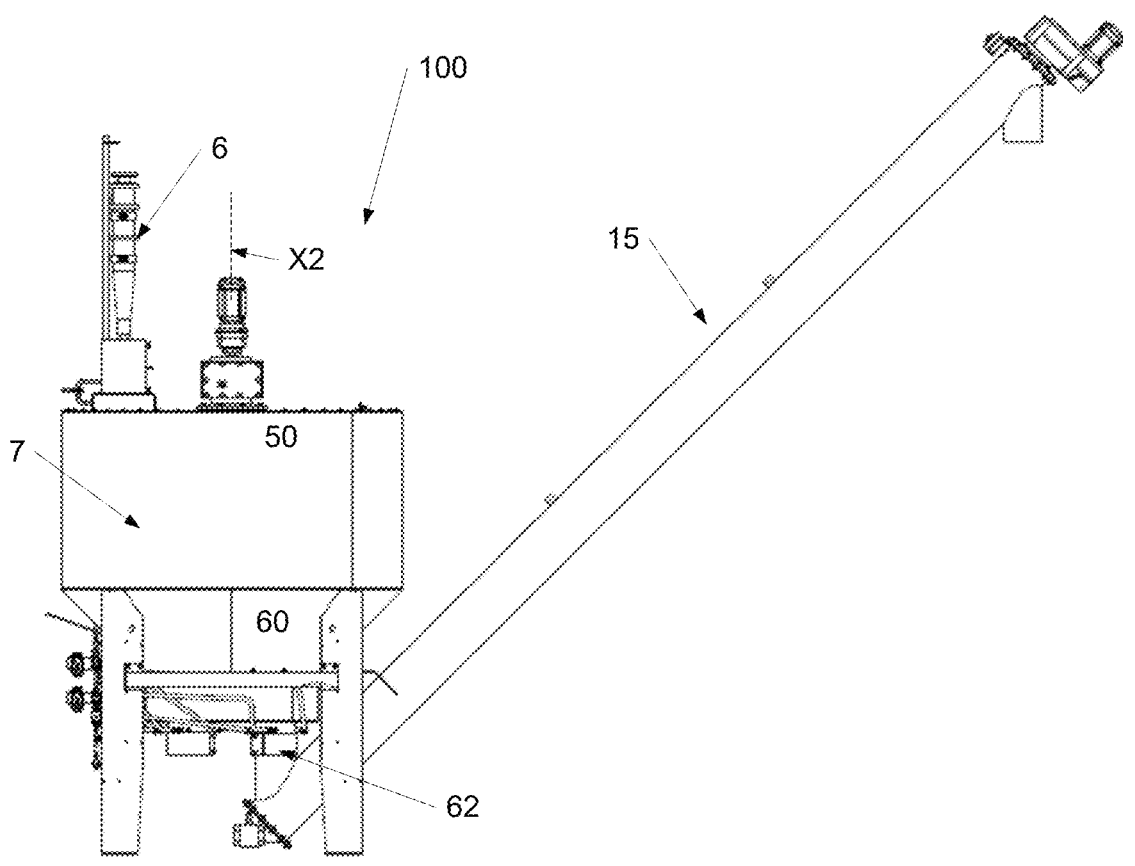
FIG. 1B shows, seen from the side, a tank element and a sand discharge element of the sand-manure liquid separation plant of FIG. 1A.
Figure 1C:
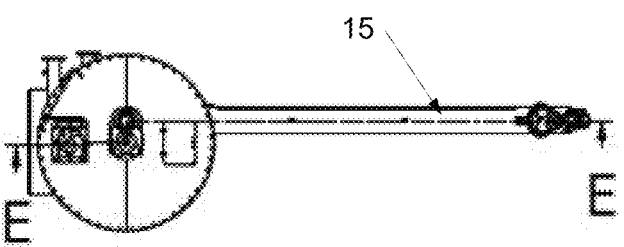
FIG. 1C is a top view of the tank element and sand discharge element shown in FIG. 1B.

In the plant 100 shown in FIG. 1A, a raw stream of sand mixed with manure liquid or a slurry including a mix of livestock excreta and urine is collected from one or more stables and led to a tank 1 for "raw manure". This tank 1 is provided with a powerful agitator to ensure a thorough mixing of slurry and sand before it is pumped further in the plant by a raw slurry pump 3. The raw stream of sand mixed with manure liquid may be mixed with water (from a flush water tank 24 to reach a required dry matter percentage).

The raw slurry pump 3 can by advantage be one or more positive displacement pumps, such as piston pumps. In an advantageous embodiment of such positive displacement pumps 3, the pump 3 includes two cylinders and two pistons, where the time when each of the pistons is at its peak (top dead center or TDC) is displaced and that the return stroke of the pistons is controlled so that when the first piston delivers its maximum pressure, the second piston has already started to build up pressure, but at a lower level. When the first piston passes its top dead center, it quickly returns to its bottom dead center in order to start building pressure already when the second piston delivers its maximum pressure. This results in a pump 3 where there are no major fluctuations in pump pressure during a pump cycle.

In a pipeline leading the raw stream of sand mixed with manure liquid further in the plant is provided a macerator 5 which ensures the comminution of coarse dry matter parts and separates foreign objects such as stones, cow teeth, hooves or parts of hooves, ear tags, patches, bandages or large pieces of wood. Hereby it is ensured that such larger particles as mentioned before, are disintegrated so that they do not clog the plant and cause unnecessary downtime. The pipeline 4, also referred to as a connecting pipe, may comprise a dry matter meter 2 and a flow meter 9.

The pipeline 4 leads the raw stream of sand mixed with manure liquid into a cyclone 6 for pre-separation and then the mixture gravitates into the tank for processing the mixture 7. The raw stream of sand mixed with manure liquid containing organic material is pumped into the cyclone 6 via a tangential inlet and through the cyclone 6 into a top portion of the tank.

In the cyclone 6, the sand material is pre-separated from the manure liquid or slurry by the function of the cyclone 6 and the difference in density between sand and liquid. The cyclone 6 can control and sort the particles based on the particle mass. In one or more embodiments, the particle mass can be controlled down to 1 to 2 grams. The part of the liquid that is free of sand is forced out through the top of the cyclone 6, while the rest with the heavier sand flows out through the outlet portion of the cyclone 6 at a bottom part of the cyclone 6.

Figure 1D:
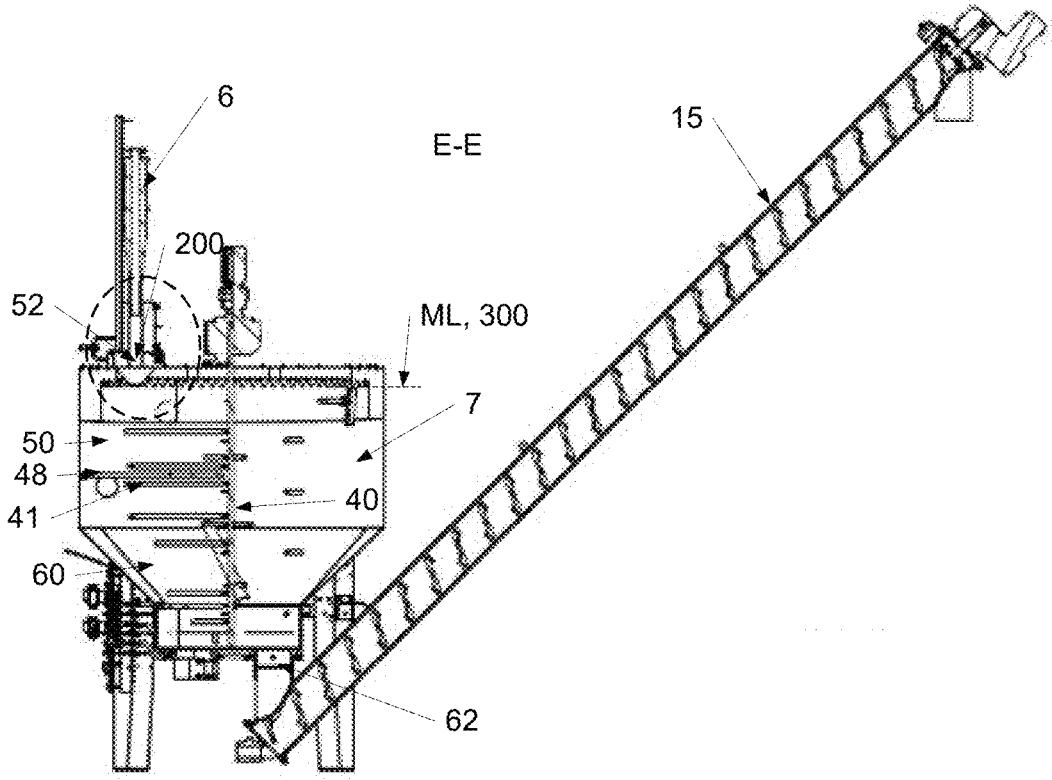
FIG. 1D shows a cross-section, at line E-E, of the tank element and sand discharge element of FIG. 1C.

A slow-moving rotary stirrer is mounted inside the tank 7, which separates sand and organic matter. The rotary stirrer is shown in FIG. 1D. The rotary stirrer includes a plurality of curved arms extending from at substantially vertical rotational axis and can have different embodiments showing different number of arms, having different lengths, having different diameters and having different curvatures.

The sand settles at the bottom of the tank 7. The sand-free manure liquid (residual slurry) with the organic material remains at the top of the tank 7 and flows out through the outlet 13 of the tank, via an overflow, and is transported back to the raw manure tank 1. A pipeline 14 including a valve may be used for removing residuals and/or sludge that would otherwise clog the tank. The valve can be opened when needed, often 2 to 3 times a day depending on the need.

The level of sand at the bottom of the tank 7 will increase during operation. This will increase the resistance of the rotary stirrer. When the load on a gear motor driving the stirrer reaches a certain upper level, one or more screw conveyors 15 will operate in an on/off setting. The moment less sand is supplied than is transported away via the screw conveyors 15, the load on the stirrer gear motor will decrease and when a predetermined lower level is reached, the screw conveyors 15 will stop. Each sand-manure liquid separation plant can comprise between 1 to 4 screw conveyers, and each screw conveyer can process up to 1500 kg sand per hour.

At the bottom of the tank 7 there is a rinsing water arrangement 16 which makes it possible to rinse the sand continuously with water, so that organic material is washed out and the sand cleaned. Upon an external start signal, the tank's 7 water valve 17 opens. The water valve 17 is open until the flow is above the minimum flow sensor setpoint. If the pressure of the water changes so that the pressure drops and the flow falls below the minimum, the valve 17 opens further to maintain the desired flow. If the pressure increases so that the flow reaches the sensor for maximum flow, the valve 17 will close so that the flow falls below the maximum.

Sand 22 being discharged from the one or more screw conveyors 15 ends in a container or a pile and when the sand is sufficiently dry, it can be used for bedding material again. In one or more embodiments, the washed sand contains less than 3% by weight of organic matters.

Manure liquid and organic materials, rejected upwards by the cyclone 6, are transported to a rotary screen filter 23, also called a drum screen, where the thin materials are mechanically separated from the thick materials. The thick medium is sand-free manure liquid, which can be used for biogas, is transported to a tank 25 for manure liquid free of sand. The thin material is transported into the flush water tank 24 and is used for diluting the raw manure in the raw manure tank 1.

Figure 2:
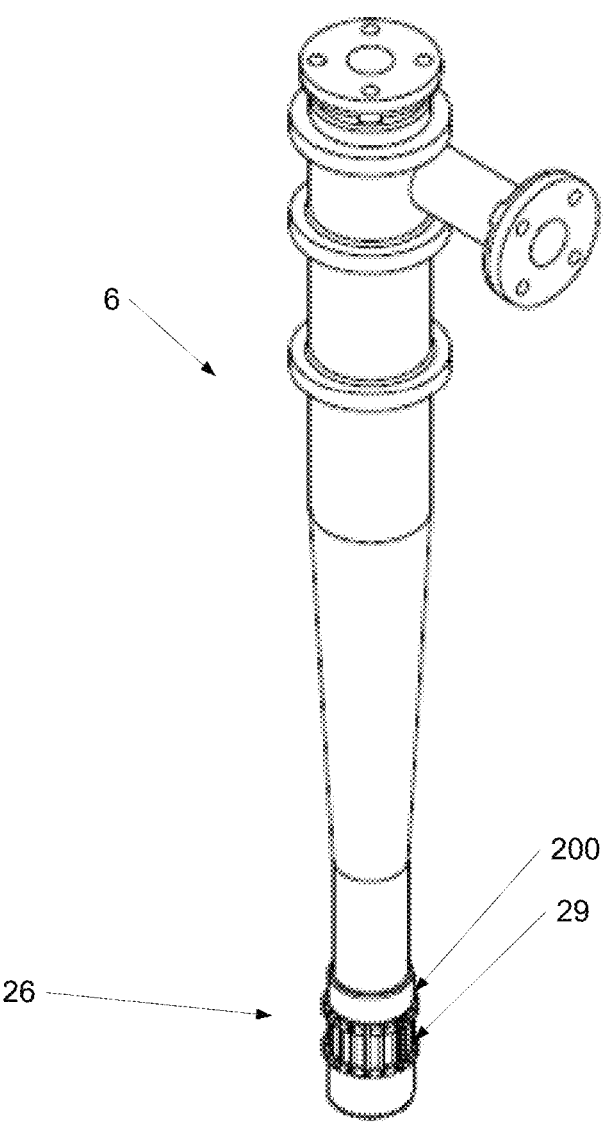
FIG. 2 shows an embodiment of a cyclone of the plant of FIG. 1A in accordance with the present invention.
Figure 3:
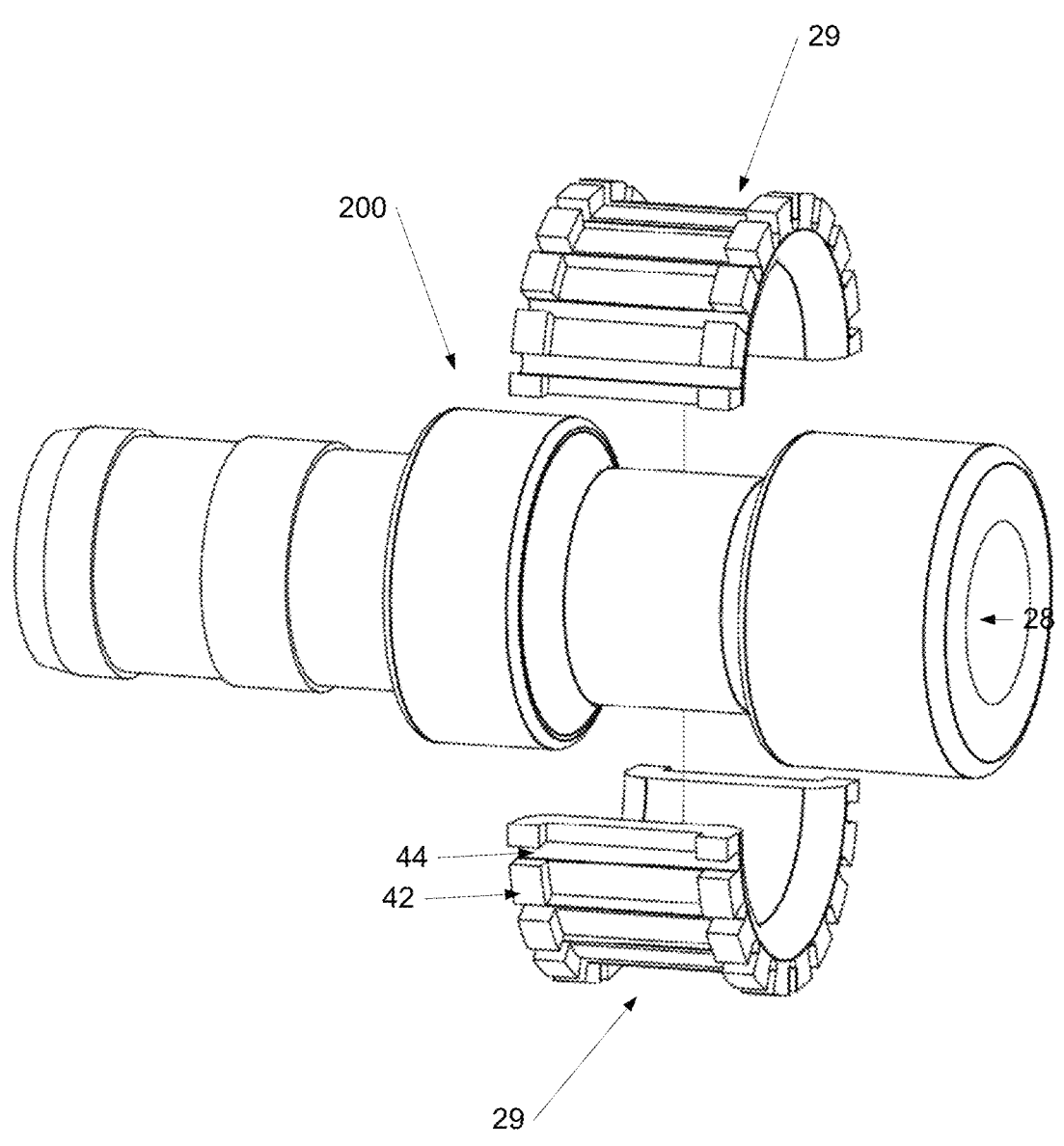
FIG. 3 shows a flow restriction portion of the cyclone of FIG. 2, with a two-part clamping body.

FIG. 2 shows the cyclone 6. The cyclone 6 has an outlet portion 26 at a bottom part of the cyclone 6 including the flow restriction portion 200. At the top of the cyclone 6, an inlet leads the raw stream of sand mixed with manure liquid containing organic material into the cyclone 6. In the cyclone 6, the sand material is pre-separated from the manure liquid or slurry by the function of the cyclone 6 and the difference in density between sand and liquid. The cyclone 6 can control and sort the particles based on the particle size. The part of the liquid that is free of sand is forced out through an outlet at the top of the cyclone 6, while the rest with the heavier sand flows out through the outlet portion of the cyclone at a bottom part of the cyclone. The liquid that is free of sand being rejected upwards by the cyclone will be transported to a drum screen for mechanical separation. A clamping body 29 is engaging the outer periphery of the flow restriction portion 200.

Figures 4A, 4B, 4C, 4D:
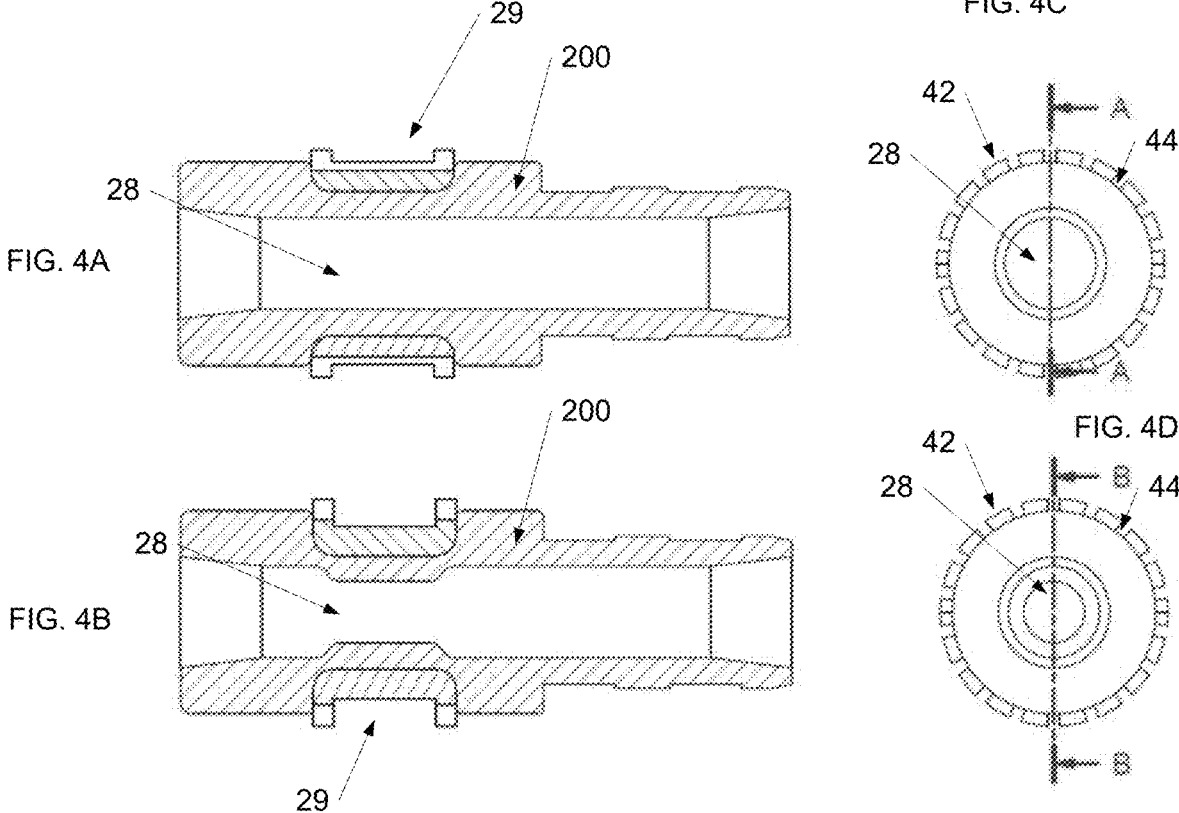
FIGS. 4A-D shows the flow restriction portion of FIG. 3, where

FIGS. 3 and 4A-4D shows the flow restriction portion 200 in greater details, where FIGS. 4A and 4C show the flow restriction portion 200 in a non-compressed state, and where FIGS. 4B and 4D show the flow restriction portion 200 in a compressed state.

The clamping body 29 is engaging the outer periphery of the flow restriction portion 200, the clamping body 29 being adjustable to vary the cross-section of the through-going passage 28 of the flow restriction portion. The clamping body 29 is enclosing the flow restriction portion 200 during operation. In the embodiment shown in these figures, the clamping body 29 is made of a polymeric material and includes a plurality of first segments 42 interconnected by a plurality of thin walled second segments 44. When the clamping body is providing a pressure against the outer periphery of the flow restriction portion the thin walled segments is able to bulge.

However, in one or more embodiments, the clamping body could also be a segmented clamping body. In one or more embodiments the clamping body could be a clamping body defined by a plurality of radially inwardly moving segment driven inwardly by the actuator which serves to rotate an outer disc engaging engaging-portions defined by faces on the segments (as detailed in FIGS. 5A-5D). In another embodiment, the clamping body could be a structure operating in the manner of an iris valve (which does not close fully), such as by including a series of leaves or vanes which rotate in from the outer edge of a circular opening towards a center or in the form of an iris diaphragm, or a similar mechanism that can vary the diameter of the through-going passage of the flow restriction portion. The through-going passage 28 is having a circular cross-section, wherein the cross-section of the through-going passage is adjustable to assume a diameter in the range of 25 to 55 mm, such as in the range of 30 to 50 mm, such as in the range of 32 to 48 mm, such as in the range of 34 to 44 mm. The clamping body 29 may optionally be removable from the outlet portion 26 and replaceable.

Figures 5A, 5B, 5C, 5D:
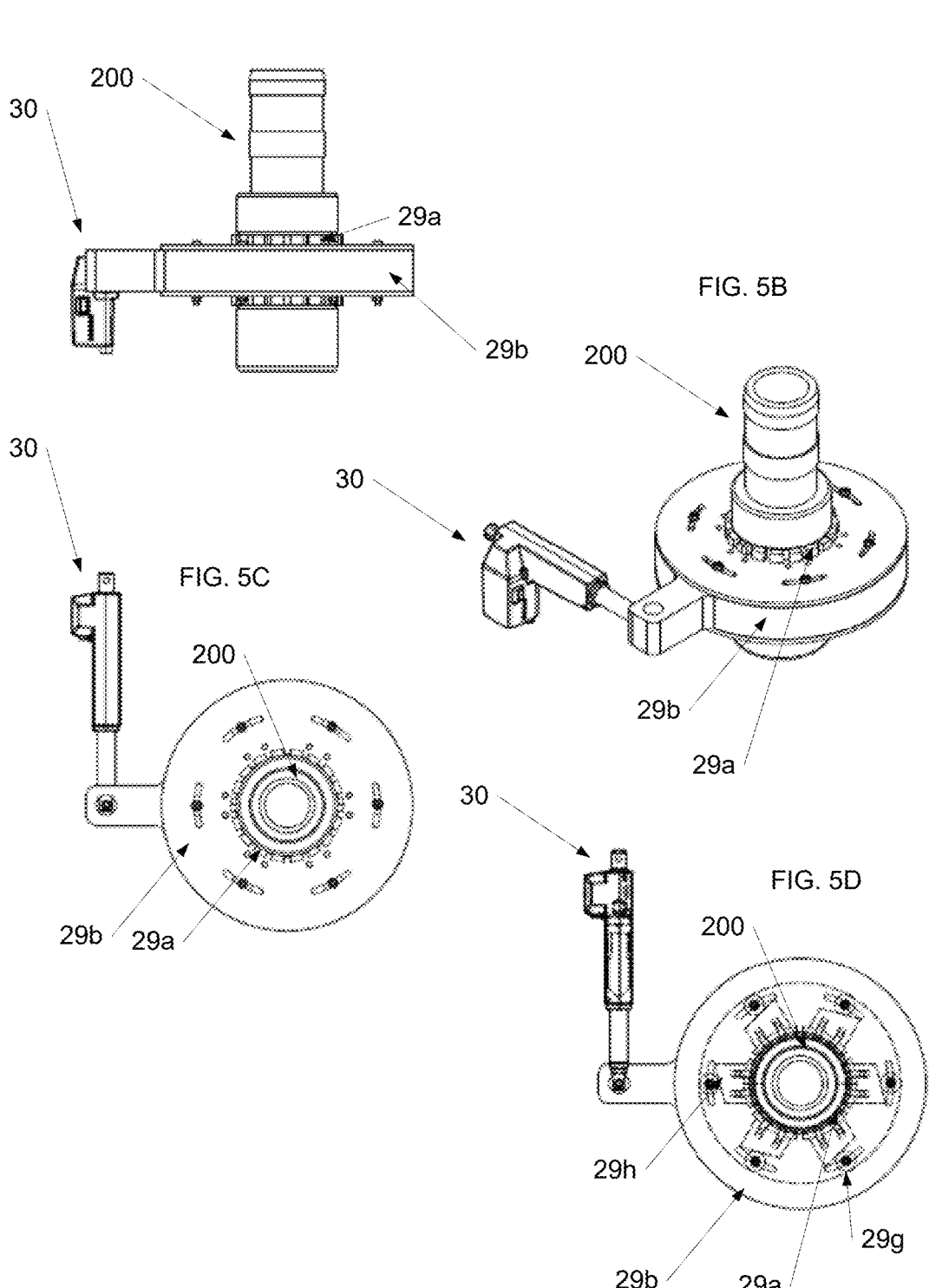
FIGS. 5A-D show the flow restriction portion of FIG. 3 engaged by and embodiment of two surrounding clamping bodies.

FIGS. 5A, B, C, and D show the flow restriction portion 200, where in these figures two clamping bodies are engaging the outer periphery of the flow restriction portion 200—clamping body 29*a* and 29*b*. FIG. 5A is a view from the side, FIG. 5B is an isometric view, and FIG. 5C is a top view, where FIG. 5D is a cross section of the top view. In these figures and FIGS. 4A-4D, a clamping body 29*a* including a plurality of first segments 42 interconnected by a plurality of thin walled second segments 44 engage the outer periphery of the flow restriction portion 200. The clamping body 29*a* may be made of a polymeric material. Further a clamping body 29*b*—defined by a plurality of radially inwardly moving segment 29*h* driven inwardly by the shown linear actuator 30 which serves to rotate an outer disc 29*g* engaging engaging-portions defined by slanted faces on the segments 29*h* such that the linear motion of the actuator 30 brings about the radial movement of the segments 29*h* so as to provide a radially inwardly directed clamping force against either the outer periphery of the aforementioned clamping body 29*a*, if present, or directly against the outer periphery surface of the flow restriction portion. Alternatively, the clamping body 29*b* could in another embodiment by a structure operating in the manner of an iris valve (which does not close fully), such as by including a series of leaves or vanes which rotate in from the outer edge of a circular opening towards a center or in the form of an iris diaphragm, or a similar mechanism that can vary the diameter of the through-going passage of the flow restriction portion. The clamping body may be made in a hard durable material. The segmented clamping body is especially good at maintaining an even circular geometry of the through-going passage during the adjustment of the clamping body 29*b*. The clamping body 29*b* is connected to an actuator 30. The adjustment of the clamping body 29*b* follows an adjustment command send by a control unit to the actuator 30, thereby adjusting the output flow of mixture into the tank.

In one or more embodiments, the clamping body 29*a* including a plurality of first segments 42 interconnected by a plurality of thin walled second segments 44 engaging the outer periphery of the flow restriction portion 200 could be left out, so that only the segmented clamping body 29*b*, is engaging the outer periphery of the flow restriction portion 200.

The adjustment command may be based on desired degree of separation of the raw stream of sand mixed with manure liquid of at least 95% by weight or more, or such as 97% by weight or more. The adjustment command may be based on a measured value of the dry matter in the raw stream of sand mixed with manure liquid, flow as measured by a flow meter for registering a flow of material rejected upwards from the cyclone, flow as measured by a flow meter for registering a flow of the raw stream of sand mixed with manure liquid into the cyclone and/or pressure as measured by an apparatus for measuring pressure (a pressure transmitter) for registering a pressure of the raw stream of sand mixed with manure liquid inflow to the cyclone.

Figure 6A:
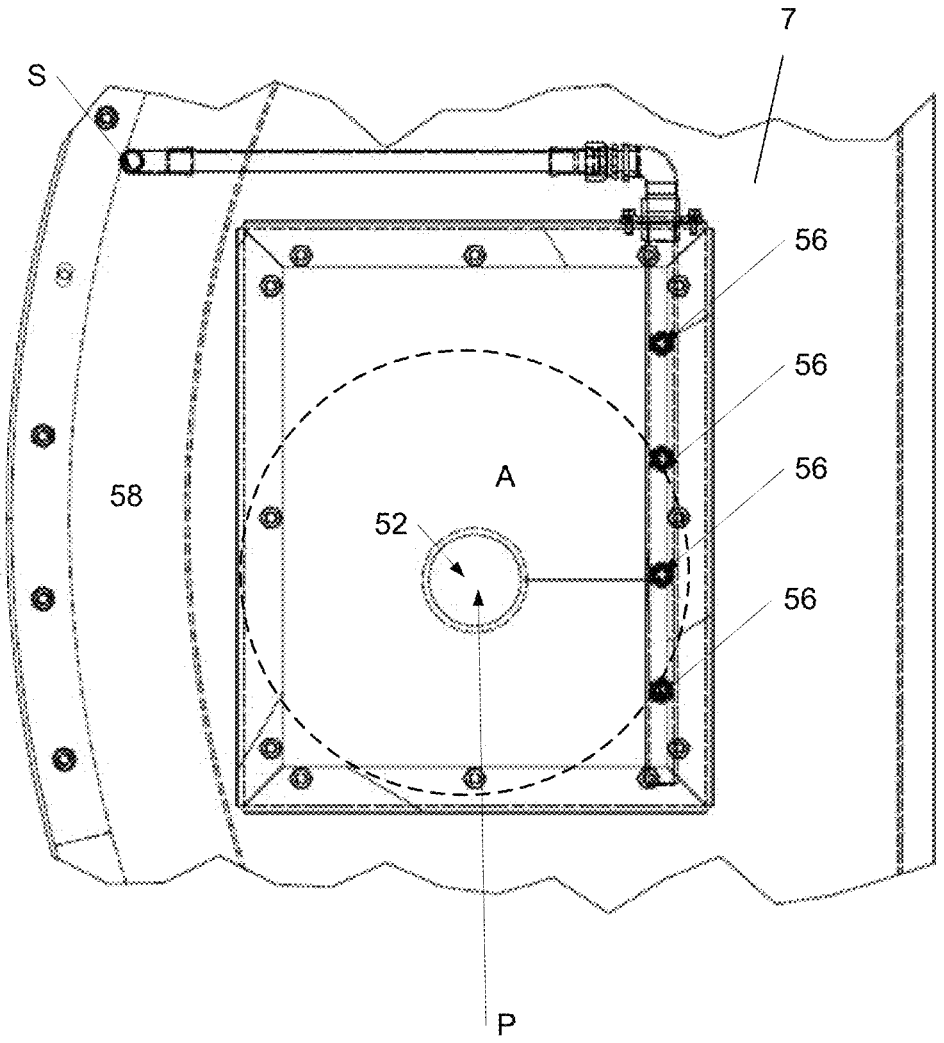
FIGS. 6A-C show the portion of the tank marked with a broken line circle in FIG. 1D, seen from above (FIG. 6A) and in two cross-sectional side views (FIGS. 6B-6C) representing a respective embodiment.
Figure 6B:
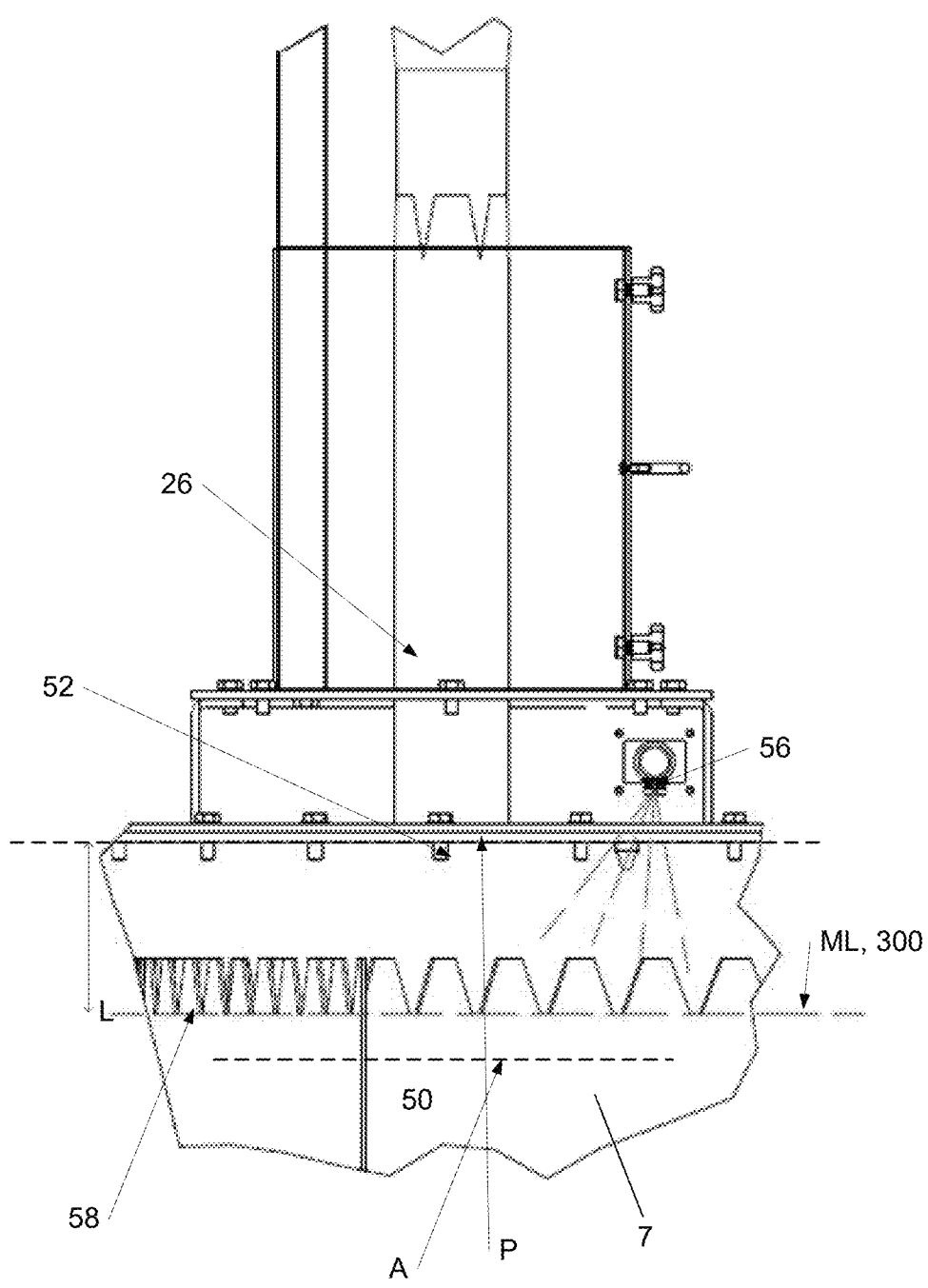
Figure 6C:
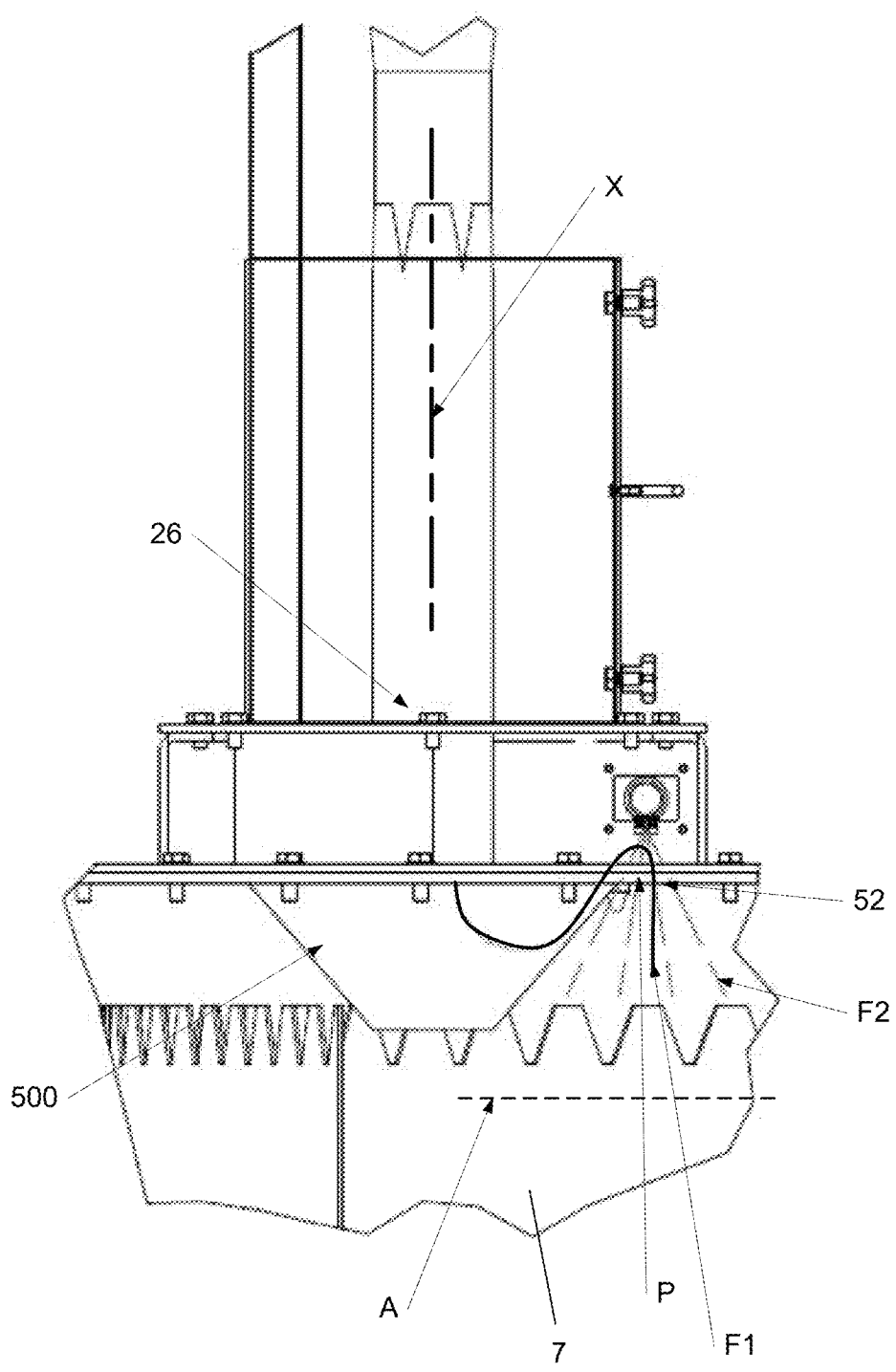

FIGS. 6A-6C show details of a plant according to the invention, incorporating two differently configured mixture inlets 52. As shown, the tank 7 generally has in its top portion 50 a mixture inlet 52 for filling the mixture to be processed into the tank 7, and the aforementioned bottom portion including the sand discharge.

The tank 7 also includes structure for defining a maximum level ML of filling of the mixture within the tank 7, such as in the way of a circular gutter 58 mounted to the inside periphery of the tank wall. The mixture inlet 52 is arranged at a general position P relative to the peripheral wall of the tank, at a height L above the maximum level ML of filling.

Moreover, the tank 7 of the plant further includes a number of fluid outlet(s) 56 that are connected to a source S, such as a fluid container or a fresh water supply, of a fluid, and that are also arranged at a level or height above the maximum level ML of filling. In operation, the fluid outlets 56 deliver a flow of the aforementioned fluid generally directed, by properly orienting the fluid outlets 56, towards pre-determined portions of the surface 300 of the mixture in the tank, which level normally corresponds to the maximum level ML, below the position P of the mixture inlet 52.

Where, as shown, the plant 100 includes a pre-separator cyclone 6 as discussed above, the mixture to be processed in the tank 7 flows into the tank 7 by gravity via the cyclone outlet portion 26 and the mixture inlet 52, the latter typically including an aperture formed in a shielded part of a cover of the tank 7, in which shielded part the cyclone outlet portion 26 connects to the mixture inlet 52.

As shown in FIGS. 6B and 6C, the one or more fluid outlet(s) 56 are arranged adjacent the mixture inlet 52 such that fluid discharged from the fluid outlets 56 will strike the surface 300 where also mixture filled into the tank 7 via the mixture inlet hits the surface 300, i.e. in an area shown generally by letter A.

In one embodiment shown in FIG. 6C the mixture inlet 56 includes a bowl-shaped body 500 placed below the aforementioned aperture so as to directly receive the flow of incoming mixture, which flow is then discharged further through an annular passage extending around at least a portion of the bowl-shaped body 500, to flow around the annular outer periphery of the bowl-shaped body and then cascade annularly into the tank in a somewhat annular portion A of the surface 300, of which a portion is shown in FIG. 6C. The bowl-shaped body 500 dampens the incoming flow of the mixture where desired.

FIG. 6B shows an alternative embodiment without any such flow dampening body 500 and, hence, where the incoming flow of the mixture is discharged directly onto a generally circular portion of the surface 300, as seen also in FIG. 6A. The two embodiments have in common the aforementioned fluid outlet(s) 56 that are arranged such that fluid discharged from the fluid outlets 56 will strike that portion A of the surface 300 where also mixture filled into the tank 7 via the mixture inlet 52 hits the surface 300. This results in a breaking-up of the surface 300, i.e. to eliminate the tendency of the mixture to behave as if its surface were covered with a stretched elastic membrane reflecting what is often used to describe the effect of surface tension.

This "breaking-up" is of particular importance where fine sand is used by the farmer as bedding, which fine sand may be defined as a sand fraction where 90% by weight or more, such as 95% by weight or more of the sand has a grain size between 100 micron and 300 micron, since such fine sand may otherwise tend to remain on the surface 300 of the mixture in the tank, thus delaying the rate of settling of the sand within the bottom part of the tank 7.

While the aforementioned fluid may be a gas, such as compressed air, or a liquid containing a surfactant, it is preferred to use water, in particular fresh water typically available at farms, the fluid outlets 56 being configured to inject the fluid into the mixture.

In use, the plant is operated by filling into the tank 7 the mixture, where 90% by weight or more, such as 95% by weight or more of the sand has a grain size of between 100 micron and 300 micron and providing during the filling, or for a substantial time during the filling, a flow of the fluid into the tank 7, oriented towards a part of the surface 300 of the mixture in the tank 7 below the mixture inlet 52, and discharging continuously or intermittently the settled sand from the tank (7). The flow of the fluid into the mixture is preferably provided when the surface 300 of the mixture is at the maximum level ML.

REFERENCES

100 sand-manure liquid separation plant
1 tank for "raw manure"
2 dry matter meter
3 pump
4 pipe
5 macerator
6 cyclone
7 tank for processing a mixture of sand and manure liquid
9 flow meter
13 outlet of the tank
14 outlet for sludge
15 screw conveyor
16 water arrangement including water inlets
17 water valve
22 discharged sand
23 rotary screen filter
24 flush water tank
25 tank
200 flow restriction portion
26 outlet portion of the cyclone
28 through-going passage
29 clamping body
30 actuator
42 first segment(s)
44 thin walled second segment(s)
50 top portion
52 mixture inlet
56 fluid outlet(s)
58 overflow
40 stirrer
60 bottom portion
62 sand discharge
300 surface
500 bowl-shaped body

The invention claimed is:

1. A sand-manure liquid separation plant comprising: a tank containing a mixture of sand and manure liquid to be processed in the tank, the tank comprising: a top portion comprising a mixture inlet for filling the mixture of sand and manure liquid to be processed into the tank; and a bottom portion comprising a sand discharge that discharges sand settled in the bottom portion wherein the sand discharge communicates with an upwardly extending screw conveyor configured to discharge sand away from the sand-manure liquid separation plant; wherein a maximum level (ML) of filling of the mixture of sand and manure liquid is defined within the tank; and wherein the mixture inlet is arranged at a level (L) above the maximum level (ML) of filling; a number of fluid outlet(s) connectable to a source of a fluid and arranged above the maximum level (ML) of filling, the number of fluid outlet(s) being configured to provide a flow of the fluid directed towards the maximum level (ML), below the mixture inlet; and a pre-separator that receives a raw stream of sand mixed with manure liquid, the pre-separator comprising a cyclone, wherein an outlet portion of the cyclone at a bottom part of the cyclone is arranged at the top portion of the tank contains the mixture of sand and manure liquid to be processed in the tank to flow into the tank by gravity via the outlet portion and the mixture inlet, wherein the bottom portion further comprises a water inlet arrangement with a number of water inlets for supplying water under pressure to the tank, wherein the water inlets are configured for providing an upward flow of the supplied water within the tank towards the maximum level (ML).

2. The plant of claim 1, wherein the maximum level (ML) being defined by a level of an overflow for the mixture of sand and manure liquid contained in the tank.

3. The plant of claim 1, the number of fluid outlet(s) being arranged adjacent the mixture inlet.

4. The plant of claim 1, wherein 90% by weight or more of the sand has a grain size between 100 microns and 300 microns.

5. The plant of claim 1, wherein the fluid comprises a surfactant.

6. The plant of claim 1, wherein the fluid comprises water.

7. The plant of claim 1, wherein the fluid comprises a gas under pressure.

8. The plant of claim 1, wherein the number of fluid outlet(s) being configured to inject the fluid into the mixture of sand and manure liquid.

9. The plant of claim 1, the bottom portion comprising a rotary stirrer.

10. The plant of claim 9, wherein the rotary stirrer rotates about a central axis of the tank, wherein the number of fluid outlet(s) and the mixture inlet are arranged offset from the central axis.

11. A sand-manure liquid separation plant comprising: a tank containing a mixture of sand and manure liquid to be processed in the tank, the tank comprising: a top portion comprising a mixture inlet for filling the mixture of sand and manure liquid to be processed into the tank; and a bottom portion comprising a sand discharge that discharges sand settled in the bottom portion, wherein the sand discharge communicates with an upwardly extending screw conveyor configured to discharge sand to form a pile of the sand that is discharged; wherein a maximum level (ML) of filling of the mixture of sand and manure liquid is defined within the tank; and wherein the mixture inlet is arranged at a level (L) above the maximum level (ML) of filling; a number of fluid outlet(s) connectable to a source of a fluid and arranged above the maximum level (ML) of filling, the number of fluid outlet(s) being configured to provide a flow of the fluid directed towards the maximum level (ML), below the mixture inlet; and a pre-separator that receives a raw stream of sand mixed with manure liquid, the pre-separator comprising a cyclone, wherein an outlet portion of the cyclone at a bottom part of the cyclone is arranged at the top portion of the tank contains the mixture of sand and manure liquid to be processed in the tank to flow into the tank by gravity via the outlet portion and the mixture inlet; wherein the bottom portion further comprises a water inlet arrangement with a number of water inlets for supplying water under pressure to the tank, wherein the water inlets are configured for providing an upward flow of the supplied water within the tank towards the maximum level (ML).

12. The plant of claim 11, wherein the maximum level (ML) being defined by a level of an overflow for the mixture of sand and manure liquid contained in the tank.

13. The plant of claim 11, the number of fluid outlet(s) being arranged adjacent the mixture inlet.

14. The plant of claim 11, wherein 90% by weight or more of the sand has a grain size between 100 microns and 300 microns.

15. The plant of claim 11, wherein the fluid comprises a surfactant.

16. The plant of claim 11, wherein the fluid comprises water.

17. The plant of claim 11, wherein the fluid comprises a gas under pressure.

18. The plant of claim 11, wherein the number of fluid outlet(s) being configured to inject the fluid into the mixture of sand and manure liquid.

19. The plant of claim 11, the bottom portion comprising a rotary stirrer.

20. The plant of claim 19, wherein the rotary stirrer rotates about a central axis of the tank, wherein the number of fluid outlet(s) and the mixture inlet are arranged offset from the central axis.

21. The plant of claim 11, wherein the pile is formed adjacent to the tank.

\* \* \* \* \*